(12) United States Patent
Hillesund et al.

(10) Patent No.: US 8,098,542 B2
(45) Date of Patent: Jan. 17, 2012

(54) COMBINED ELECTROMAGNETIC AND SEISMIC ACQUISITION SYSTEM AND METHOD

(75) Inventors: Øyvind Hillesund, Nesbru (NO); Nils Lunde, Houston, TX (US)

(73) Assignee: PGS Geophysical AS, Lysaker (NO)

( * ) Notice: Subject to any disclaimer, the term of this patent is extended or adjusted under 35 U.S.C. 154(b) by 218 days.

(21) Appl. No.: 12/319,264

(22) Filed: Jan. 5, 2009

(65) Prior Publication Data
US 2010/0172205 A1 Jul. 8, 2010

(51) Int. Cl.
*G01V 1/38* (2006.01)
(52) U.S. Cl. .......................................... 367/20; 367/153
(58) Field of Classification Search ............... 181/112, 181/111; 324/323, 334, 365, 337; 367/15, 367/20, 106, 131, 177, 140, 141, 153, 154, 367/188; 702/7
See application file for complete search history.

(56) References Cited

U.S. PATENT DOCUMENTS

| | | | |
|---|---|---|---|
| 4,967,400 A * | 10/1990 | Woods | 367/21 |
| 6,477,111 B1 * | 11/2002 | Lunde et al. | 367/20 |
| 6,914,433 B2 | 7/2005 | Wright et al. | |
| 7,239,577 B2 | 7/2007 | Tenghamn et al. | |
| 7,328,107 B2 | 2/2008 | Strack et al. | |
| 7,330,790 B2 | 2/2008 | Berg | |
| 7,340,348 B2 | 3/2008 | Strack et al. | |
| 7,359,283 B2 | 4/2008 | Vaage et al. | |
| 7,446,535 B1 | 11/2008 | Tenghamn et al. | |
| 7,453,763 B2 | 11/2008 | Johnstad | |
| 7,602,191 B2 | 10/2009 | Davidsson | |
| 7,671,598 B2 | 3/2010 | Ronaess et al. | |
| 7,805,250 B2 | 9/2010 | Colombo et al. | |
| 7,912,649 B2 | 3/2011 | Harris et al. | |
| 2002/0130636 A1 * | 9/2002 | Yokokura et al. | 320/122 |
| 2005/0052951 A1 * | 3/2005 | Ray et al. | 367/188 |
| 2007/0255499 A1 | 11/2007 | Strack et al. | |
| 2010/0017138 A1 | 1/2010 | Brady et al. | |

FOREIGN PATENT DOCUMENTS

| | | | |
|---|---|---|---|
| GB | 2421800 B | * | 12/2007 |
| JP | 7-32589 B | * | 4/1995 |
| WO | 2005006022 A1 | | 1/2005 |
| WO | 2008032082 A1 | | 3/2008 |

OTHER PUBLICATIONS

Thorsten Vollmer, European Search Report for Application No. 09178058.5-1240 / 2204673, Mailing Date: Sep. 16, 2011.

* cited by examiner

*Primary Examiner* — Jack Keith
*Assistant Examiner* — Daniel L Murphy

(57) ABSTRACT

A method for marine geophysical surveying according to one aspect of the invention includes towing at least one geophysical sensor streamer in a body of water. The streamer includes a plurality of spaced apart electromagnetic field receivers disposed at spaced apart locations along the streamer. The streamer also includes a plurality of seismic sensors disposed at spaced apart locations. The seismic sensors each include at least one pressure responsive receiver and at least one particle motion responsive receiver. At selected times, a seismic energy source is actuated in the water. Particle motion and pressure seismic signals, and electromagnetic field signals are detected at the respective receivers.

5 Claims, 3 Drawing Sheets

COMBINED ELECTROMAGNETIC AND SEISMIC ACQUISITION SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of geophysical surveying of the Earth's subsurface. More specifically, the invention relates to systems and methods for combined electromagnetic and seismic surveying of the Earth's subsurface.

2. Background Art

Techniques for geophysical surveying of the Earth's subsurface include seismic surveying and electromagnetic surveying. Seismic surveying includes deploying a seismic energy source at or near the Earth's surface above an area that is to be surveyed, and deploying one or more arrays of seismic sensors at or near the surface in the vicinity of the seismic energy source. The source is actuated at selected times and signals detected by the seismic sensors are recorded. Electromagnetic surveying includes deploying a plurality of electric and/or magnetic field sensors at or near the surface above an area to be surveyed and measuring electric and/or magnetic field amplitudes for a selected period of time. The measured electric and/or magnetic fields may result from electromagnetic radiation caused by naturally occurring phenomena (called "magnetotelluric" surveying) or may be in response to an electromagnetic field imparted into the rock formations beneath the surface (called "controlled source" surveying). Seismic and electromagnetic responses can be used to infer certain physical properties of the rock formations in the subsurface.

The foregoing geophysical surveying techniques are also used to survey formations below the bottom of a body of water such as a lake or the ocean. Such surveying, known as "marine" surveying, includes using a vessel to tow one or more cables in the water. Such cables can include a plurality of seismic sensors in the case of marine seismic surveying. A seismic energy source such as an air gun or arrays of such air guns can be deployed in the water. The seismic source is actuated and signals are detected, just as in the land based case described above. For marine electromagnetic surveying, the cable can include a plurality of electric and/or magnetic field sensors, and in the case of controlled source marine surveying, a cable including an electric and/or magnetic field generator can also be towed in the water.

Marine surveying can be particularly expensive because of the cost of operating the vessel used to tow the cables in the water. It is desirable to have methods and systems to perform marine seismic and electromagnetic surveying contemporaneously to reduce the cost of performing such surveying. It is also desirable to be able to combine seismic and electromagnetic field sensors into the same cable to reduce survey inaccuracies caused by differences in geodetic position of the sensors that inevitably occur when a survey system is deployed at different times over the same subsurface area. It is believed to be impracticable, however, to combine seismic sensing devices and electromagnetic sensing devices in a single sensor cable or streamer because seismic streamers must generally be operated at shallow water depth to reduce the effects on seismic signals from the subsurface of seismic energy reflecting from the water surface. Conversely, marine electromagnetic sensors must typically be operated at water depths believed to be unsuitable for seismic acquisition in order to reduce the effects of electromagnetic energy reflected from the water surface on electromagnetic signals from the subsurface.

SUMMARY OF THE INVENTION

A method for marine geophysical surveying according to one aspect of the invention includes towing at least one geophysical sensor streamer in a body of water. The streamer includes a plurality of spaced apart electromagnetic field receivers disposed at spaced apart locations along the streamer. The streamer also includes a plurality of seismic sensors disposed at spaced apart locations. The seismic sensors each include at least one pressure responsive receiver and at least one particle motion responsive receiver. At selected times, a seismic energy source is actuated in the water. Particle motion and pressure seismic signals, and electromagnetic field signals are detected at the respective receivers.

A marine geophysical sensor streamer according to another aspect of the invention includes a jacket extending along the length of the streamer. At least one strength member extends along the length of the streamer. A plurality of electromagnetic field sensors is disposed at spaced apart positions along the streamer. A plurality of seismic sensors is disposed at spaced apart locations along the streamer. The seismic sensors include at least one particle motion responsive sensing device and at least one pressure responsive sensing device.

Other aspects and advantages of the invention will be apparent from the following description and the appended claims.

DETAILED DESCRIPTION

Figure 1:
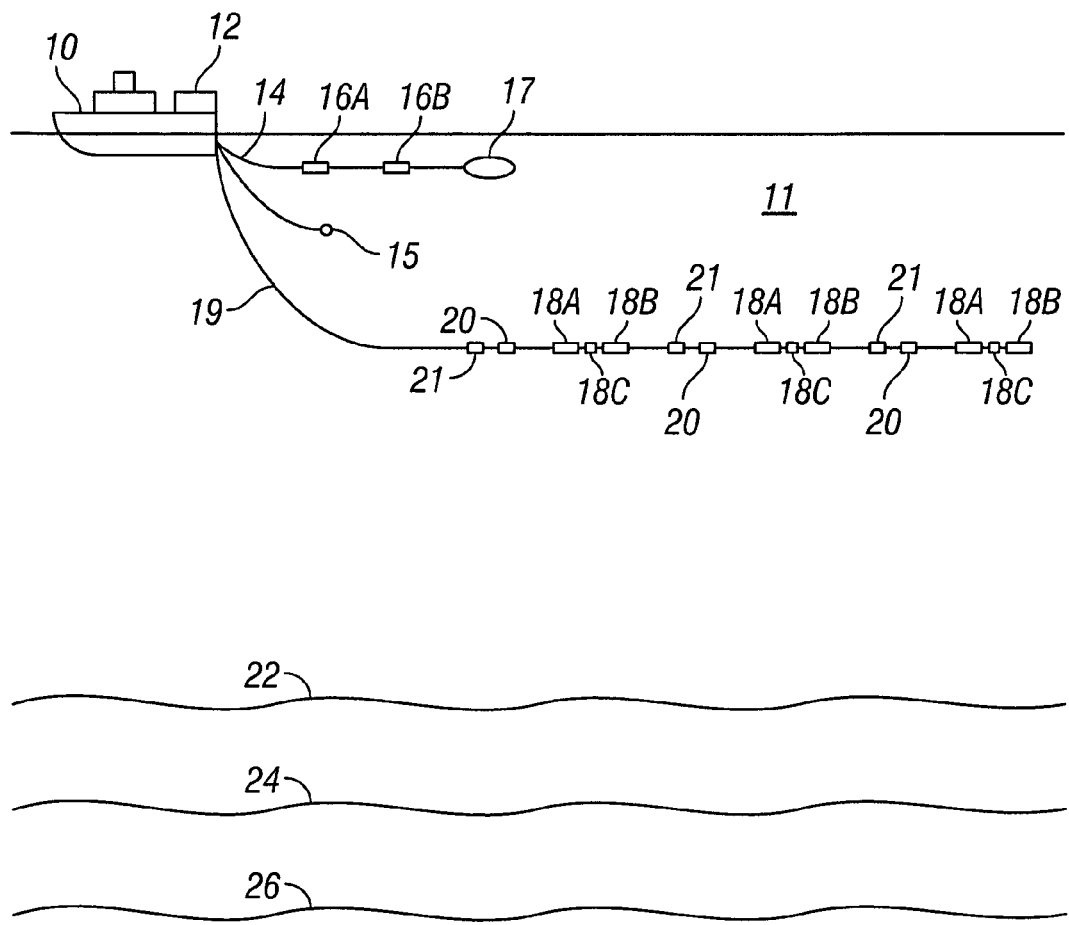
FIG. 1 shows an example marine electromagnetic and seismic survey system.

An example of a geophysical survey system that can perform contemporaneous marine electromagnetic surveying and marine seismic surveying is shown schematically in FIG. 1. The survey system includes a survey vessel 10 that moves along the surface of a body of water 11 such as a lake or the ocean. The survey vessel 10 typically includes thereon a geophysical survey recording system 12. The recording system 12 may include equipment (not shown separately for clarity of the illustration) for conducting both seismic and electromagnetic surveys, such as navigation devices to determine the geodetic position at any time of the survey vessel 10 and sensing instruments (explained below) deployed on one or more streamers in the water 11. The recording system equipment may also include power supplies and controls for actuating an electromagnetic field generator (explained below) and a seismic energy source (also explained below). The recording system equipment may also include devices for processing and recording signals generated by the various sensors (explained below) deployed in the water. Specific implementations of the recording system equipment are well known in the art and need not be described herein in further detail.

The survey vessel 10 may tow an electromagnetic source cable 14 in the water at a selected depth. The source cable 14 is used to tow the electromagnetic field generator, two examples of which are as follows. In one example, the source cable 14 may include one or more pairs of source electrodes, one such pair being shown at 16A and 16B. Electrical conductors (not shown) in the source cable are coupled between the recording system equipment and the electrodes 16A, 16B. At selected times, the recording system equipment can conduct time varying electric current between the electrodes 16A, 16B to induce an electromagnetic field in the water 11. Such electromagnetic field propagates through the water 11 to the water bottom 22 and through rock formations, 24, 26 below the water bottom 22. In the present example, the source cable 14 may include in addition to or in substitution of the electrodes 16A, 16B a wire loop or coil 17. Time varying electric current from the recording system equipment may be passed through the loop or coil 17 to induce an electromagnetic field in the water 11 and subsequently in the formations 24, 26 below the water bottom 22. It should also be noted that the arrangement shown in FIG. 1, which provides a particular orientation for the electromagnetic fields based on the described orientation of the wire loop 17 or electrodes 16A, 16B, is only intended to show an example of orientation of and type of electromagnetic field generators that can be used in various implementations of the invention. Accordingly, the example orientation of electromagnetic field generators and the types of such generator shown in FIG. 1 are not limitations on the scope of the present invention. It should also be noted that the configuration of the electric current from the recording system equipment to the electromagnetic field generator may be any of the following, without limitation. In order to induce a so-called "transient" electromagnetic field in the subsurface formations, the electric current may be direct current switched from one state to another, for example, switched on, switched off, reversed in polarity, or switched in a multiple event switching sequence, for example, a pseudo random binary sequence. Combinations of the foregoing switching events and sequences may also be used in some examples. See, for example, U.S. Pat. No. 6,914,433 issued to Wright et al. In other implementations, so called "continuous wave" electromagnetic fields may be induced by passing alternating current through the electromagnetic field generator. Such alternating current may include one or more discrete frequencies.

The survey vessel 10 may also tow one or more seismic energy sources 15, examples of which include, without limitation, air guns, water guns, marine vibrators or arrays of the foregoing. Details of marine seismic energy sources are well known in the art and need not be described in further detail herein. The seismic source 15 may be towed by the same cable (e.g., the source cable 14) as the source electrodes 16A, 16B and the loop 17, or by a different cable. The recording system equipment may be configured to actuate the seismic energy source 15 at selected times to cause seismic energy to be imparted into the water 11 and the formations 24, 26 below the water bottom, and ultimately detected as explained below.

The seismic vessel 10 may also tow a geophysical sensor cable referred to herein as a "streamer" and shown generally at 19. The streamer 19 in the present example includes a plurality of longitudinally spaced apart electromagnetic field receivers. In the present example, each electromagnetic field receiver can be an electrode pair, such as shown at 18A and 18B. The electrode pairs 18A, 18B may each be associated with an electromagnetic signal processing module 18C. Voltages may be induced across the receiver electrode pairs 18A, 18B as a result of the electric field component of naturally occurring or induced electromagnetic fields. The induced electromagnetic fields may result from passing electric current through the electromagnetic field generator (either the source electrodes 16A, 16B or the loop 17) as explained above. The voltages induced across the receiver electrodes 18A, 18B may be measured by circuitry (explained below with reference to FIG. 2) disposed in the electromagnetic signal processing module 18C.

The streamer 19 may also include a plurality of seismic sensors 20 disposed at spaced apart locations along the streamer. The seismic sensors 20 will be explained in more detail below with reference to FIG. 3, however the seismic sensors 20 generally include a particle motion responsive receiver or sensing device substantially collocated with a pressure or pressure time gradient responsive receiver or sensing device (referred to for convenience as a "pressure responsive" device). Signals detected by the seismic sensors 20 may be conducted to a seismic signal processing module 21 disposed along the streamer 19 proximate each seismic sensor 20.

Figure 2:
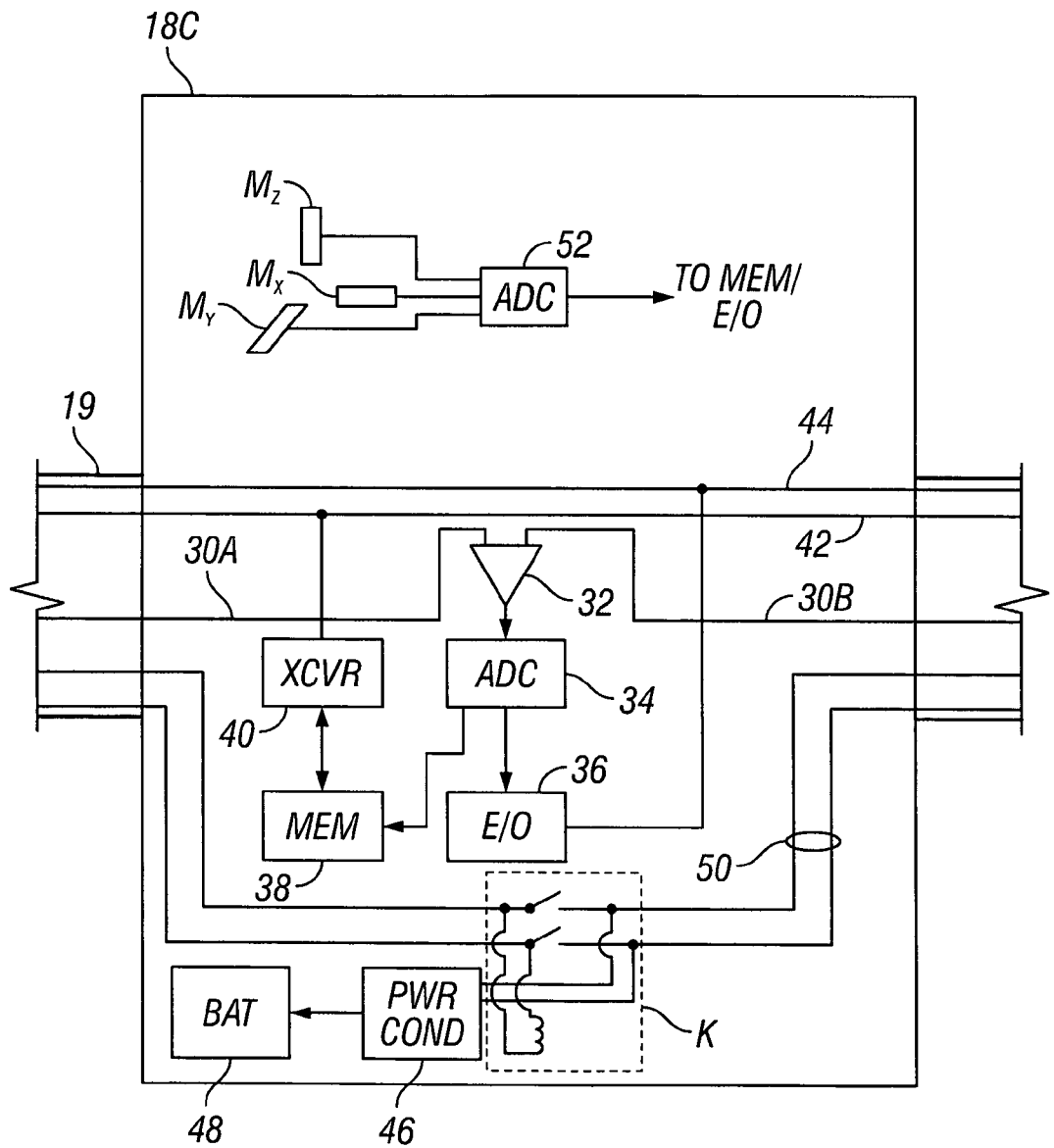
FIG. 2 shows an example of an electromagnetic signal processing module for the streamer shown in FIG. 1

An example configuration for one of the electromagnetic signal processing modules 18C is shown in FIG. 2. The electromagnetic signal processing module 18C may be disposed in a water tight housing configured to couple within the streamer 19, or may be disposed entirely within the structure of the streamer 19 itself. The particular mechanical configuration of the electromagnetic signal processing module 18C is not intended to limit the scope of the present invention. The module 18C may include electrical conductors 30A, 30B that extend along the streamer to each receiver electrode (18A, 18B) in the corresponding electrode pair. The electrical conductors 30A, 30B conduct voltage imparted across the receiver electrodes (18A, 18B in FIG. 1) to the input of a preamplifier 32. Signal output of the preamplifier 32, which will be a larger voltage related to the voltage imparted across the electrodes, may be digitized in an analog to digital converter (ADC) 34. Output of the ADC 34 may be conducted to a buffer or memory 38, and/or may be conducted to an electrical to optical (E/O) converter 36. It is within the scope of the present invention to use electrical and/or optical signal telemetry to conduct signals corresponding to the voltage measurements to the recording system (12 in FIG. 1) and/or to store the voltage measurement signals locally in the signal processing module 18C. Accordingly, both types of signals are shown in the example of FIG. 2. In the case of communicating electrical signals to the recording system, the buffer or memory 38 may be in signal communication with a telemetry transceiver 40 associated with the electromagnetic signal processing module 18C. The telemetry transceiver 40 may be in signal communication with a telemetry signal conductor or line 44 in the streamer 19. The telemetry signal conductor 44 may ultimately be coupled to a corresponding transceiver (not shown) in the recording system (12 in FIG. 1). Alternatively, or additionally, the output of the E/O converter 36 may be coupled to an optical fiber 42 which may provide one or more forms of optical signal telemetry in communication with a corresponding optical signal telemetry device (not shown) in the recording system (12 in FIG. 1). Non-limiting examples of suitable optical signal telemetry systems that may be used in some implementations are shown in U.S. Pat. No. 7,154,082 issued to Maas and assigned to an affiliate of the assignee of the present invention.

In the present example, electrical power to operate the foregoing devices may be provided by a battery 48 or electrical energy storage device disposed in or near the signal processing unit 18C. A possible advantage of using a battery or electrical energy storage device in or near each signal processing module is that it eliminates the need to conduct electrical power over the streamer 19 to operate the various signal processing devices during survey operations. By having the streamer 19 configured to avoid electric power conduction during survey operations, induction noise that may affect electromagnetic signal detection may be avoided or reduced. In a practical battery operated implementation, however, electrical conductors 50 may be provided in the streamer 19 to enable recharging the batteries 48 by conducting power from the recording system equipment. In the example shown in FIG. 2, when the conductors 50 are energized by the recording system equipment, the power provided may close a relay K associated with each signal processing module 18C, thereby completing a power supply circuit along the streamer 19 to each successive module 18C. The relay K may also be configured such that when energized, the electric power is transmitted to a power conditioner 46, e.g., a rectifier/filter/voltage regulator combination, to recharge the battery 48. Such arrangement may enable deploying the streamer 19 in the water for an extended period of time without the need to withdraw the streamer to the vessel (10 in FIG. 1) recharge the batteries 48. The arrangement shown in FIG. 2 also avoids having closed electrical conductor loops along the streamer 19 by opening the circuit of the electrical conductors 50 between successive modules 18C along the streamer 19 when the relays K are deenergized.

The example electromagnetic signal processing module 18C may also include one or more magnetometers or magnetic field component sensors such as wire loops or coils to detect magnetic components of the electromagnetic fields detected for survey purposes. The present example includes three, mutually orthogonally oriented magnetometers Mx, My, Mz. Magnetometer or magnetic field sensor signals may also be digitized in an ADC 52 for storage and/or transmission by electrical and/or optical telemetry as explained above. Such magnetic field component sensors may also be located at other positions along the streamer. The orientation, number of and type of magnetic field component sensor are not limits on the scope of the present invention.

Figure 3:
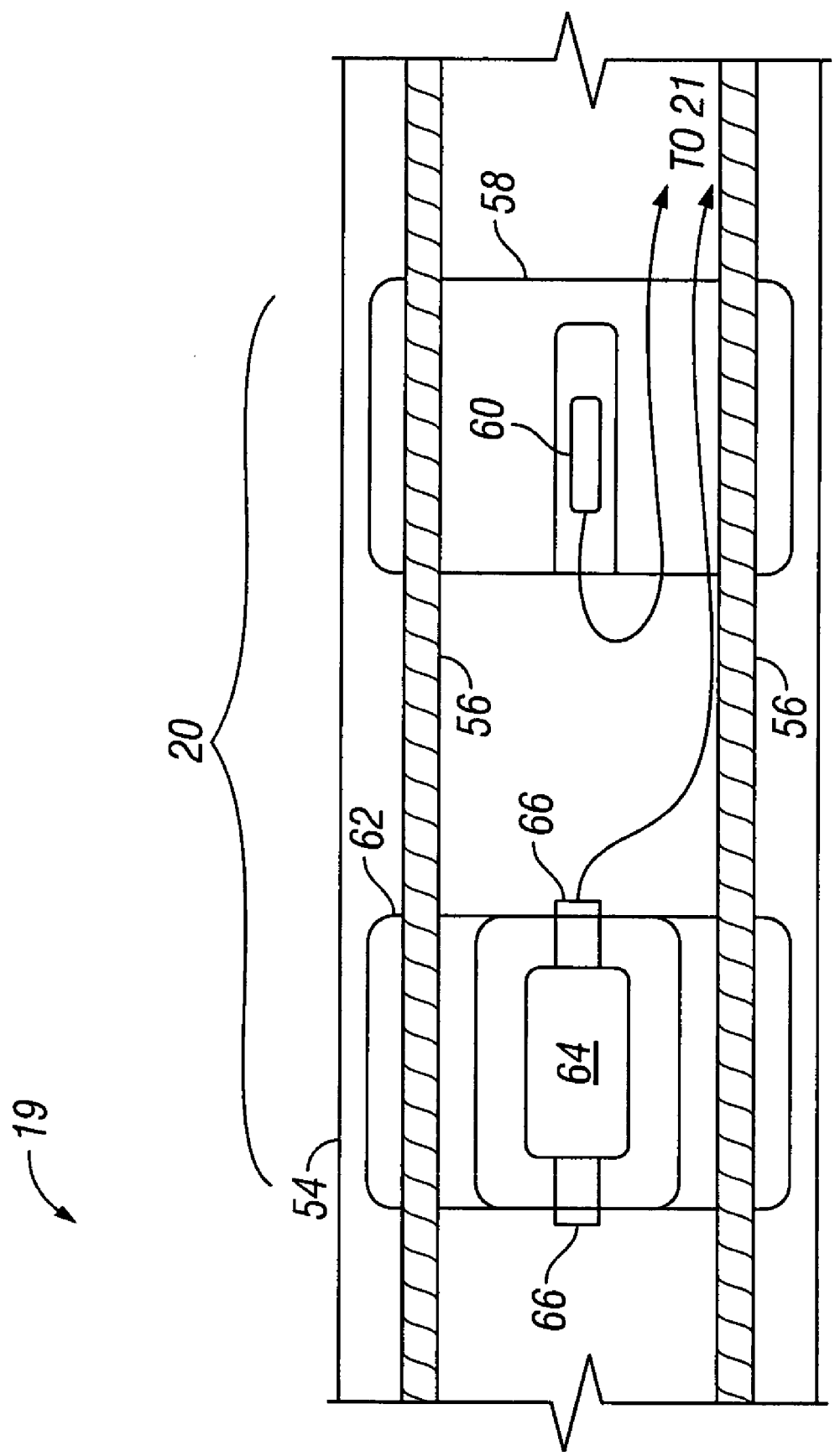
FIG. 3 shows an example of a seismic sensor configuration for the streamer shown in FIG. 1.

An example configuration for one or more of the seismic sensors 20 is shown in FIG. 3. The streamer 19 may include a jacket 54 on its exterior such as can be made from polyurethane or similar flexible materials. One or more strength members 56 extend along the length of the streamer to transmit axial force caused by towing the streamer in the water. The seismic sensor 20 as explained above, may include substantially collocated particle motion responsive sensors and pressure or pressure time gradient responsive sensors. In the present example, a sensor holder 58 may be formed from polypropylene or similar substantially rigid plastic, and coupled to the one or more strength members 56. A pressure responsive sensor such as a hydrophone 60 may be suitable mounted in a respective opening in the sensor holder 58. A particle motion responsive sensor 64 such as a geophone or accelerometer may be mounted in a gimbal bearing assembly 66 and have mass distribution such that the motion responsive sensor 64 is maintained in a selected orientation. Typically the orientation will be such that the sensitive axis of the sensor 64 will be substantially vertical, because it is the vertical component of particle motion that is of particular interest in seismic signal processing. The gimbal bearing assembly 66 and sensor 64 are disposed in a respective sensor holder 62. The sensor holder 62 may also be coupled to the one or more strength members 56. Signals generated by the motion responsive sensor 64 and the pressure responsive sensor 60 may be communicated to the seismic signal processing module (21 in FIG. 1). The details of the seismic sensor processing module may be similar to those explained above with reference to FIG. 2, in which signals from each of the sensors 60, 64 may be digitized locally and stored and/or communicated to the recording system (12 in FIG. 1) using electrical and/or optical telemetry. It should be noted that the gimbaled particle motion responsive sensing element shown in FIG. 3 may be substituted, for example, by two or three mutually orthogonal, fixedly mounted particle motion responsive sensing elements.

A particular structure for particle motion responsive sensors as used in a sensor streamer that may be used advantageously in some examples is described in U.S. Pat. No. 7,239,577 issued to Tenghamn et al. and assigned to an affiliate of the assignee of the present invention. Because the streamer in the present example includes both particle motion responsive sensors as well as pressure or pressure time gradient responsive sensors, the streamer may be operated at greater depth in the water (11 in FIG. 1) than is practical using streamers having only pressure responsive sensors. Operating such a streamer at greater water depth is possible because combining the signals from both the motion responsive sensors and the pressure responsive sensors may be performed to reduce the effects of seismic energy reflection from the water surface. See, for example, U.S. Pat. No. 7,359,283 issued to Tenghamn et al. and assigned to an affiliate of the assignee of the present invention.

The foregoing possibility of operating the streamer at greater depth than when using streamers having only pressure sensors may be used to particular advantage in a streamer such as explained above having electric field and/or magnetic field sensors disposed on the streamer for detecting components of electromagnetic fields emanating from the formations below the water bottom. As will be appreciated by those skilled in the art, marine electromagnetic surveying is preferably conducted in relatively deep water, defined as although not specifically limited to water depths greater than twice the depth below the water bottom to a target rock formation that is to be evaluated by measuring electromagnetic response of such formation to imparted electromagnetic fields. In shallower water, electromagnetic energy reflected from the water surface has been known to interfere with electromagnetic energy from the subsurface rock formations to an extent making it difficult to interpret electromagnetic signals originating in the subsurface. It is contemplated that the streamer described above can be operated successfully in water depths of 25 meters or more, while obtaining seismic signals usable for determining properties of the formations below the water bottom as may be determined using seismic signals acquired at shallower water depth.

It should also be noted that the example configuration explained with reference to FIG. 1, in which only one streamer is shown, is not intended to limit the number of streamers that may be used in other implementations. A plurality of similar streamers may be towed, for example, at laterally spaced apart locations behind the survey vessel, in a manner familiar to those skilled in the art.

A geophysical streamer and method according to the invention may provide more efficient combined electromagnetic and seismic surveying of selected areas beneath the bottom of a body of water without sacrificing quality of either the electromagnetic signals or the seismic signals.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine geophysical sensor streamer, comprising:
a jacket extending along the length of the streamer;
a least one strength member extending along the length of the streamer;
a plurality of electromagnetic field sensors at spaced apart positions along the streamer;
a plurality of seismic sensors disposed at spaced apart locations along the streamer, the seismic sensors including at least one particle motion responsive sensing device and at least one pressure responsive sensing device; and
a signal processing module associated with each electromagnetic field sensor, the signal processing module including signal processing devices for at least one of storing and communicating measurements made by the associated electromagnetic field sensor, the modules each including an electric energy storage device associated with the signal processing devices such that the signal processing devices are operable without conducting electrical power along the streamer and a relay for closing a circuit to the energy storage device for recharging thereof, the relay configured to open conductor loops along the streamer created by electrical conductors used to supply electric power to the modules.

2. The streamer of claim 1 wherein the electromagnetic field sensors comprise pairs of electrodes.

3. The streamer of claim 1 wherein the electromagnetic field sensors comprise magnetometers.

4. The streamer of claim 1 wherein the particle motion responsive sensing devices comprise geophones.

5. The streamer of claim 1 wherein the pressure responsive sensing devices comprise hydrophones.

* * * * *